I. W. NONNEMAN.
DIESTOCK.
APPLICATION FILED SEPT. 16, 1918.
1,320,644.
Patented Nov. 4, 1919.
2 SHEETS—SHEET 2.
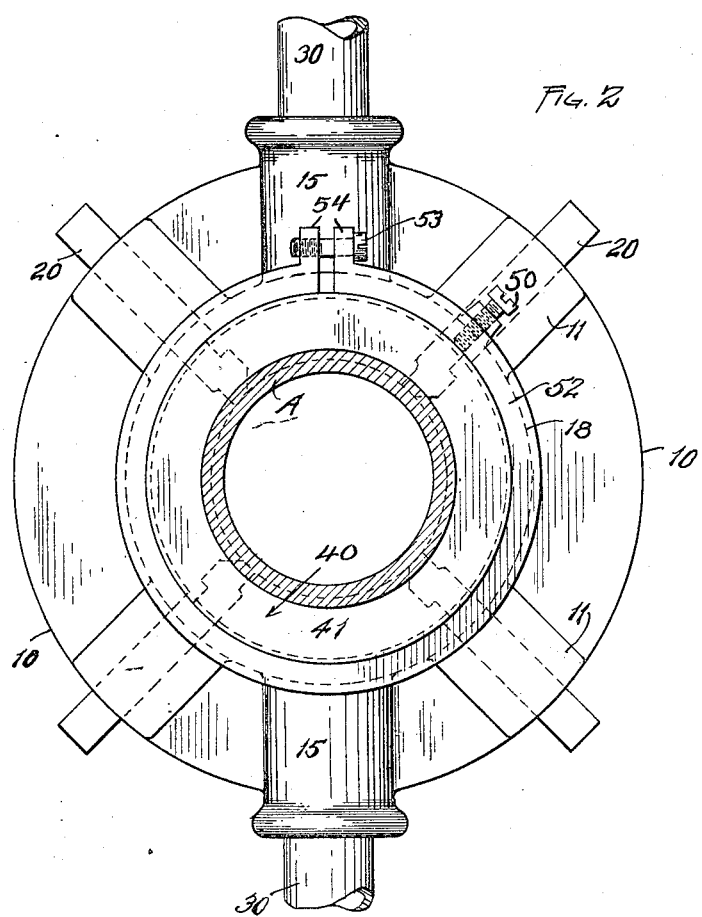
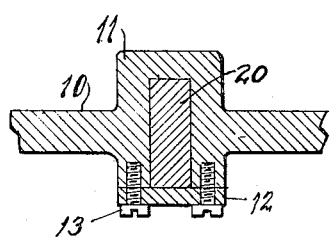
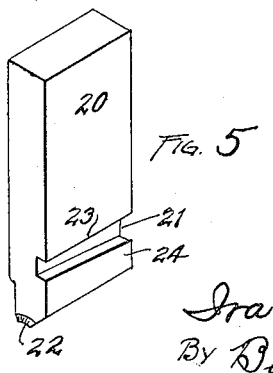
INVENTOR
Ira W. Nonneman
By Baker & Macklin,
ATTORNEYS.

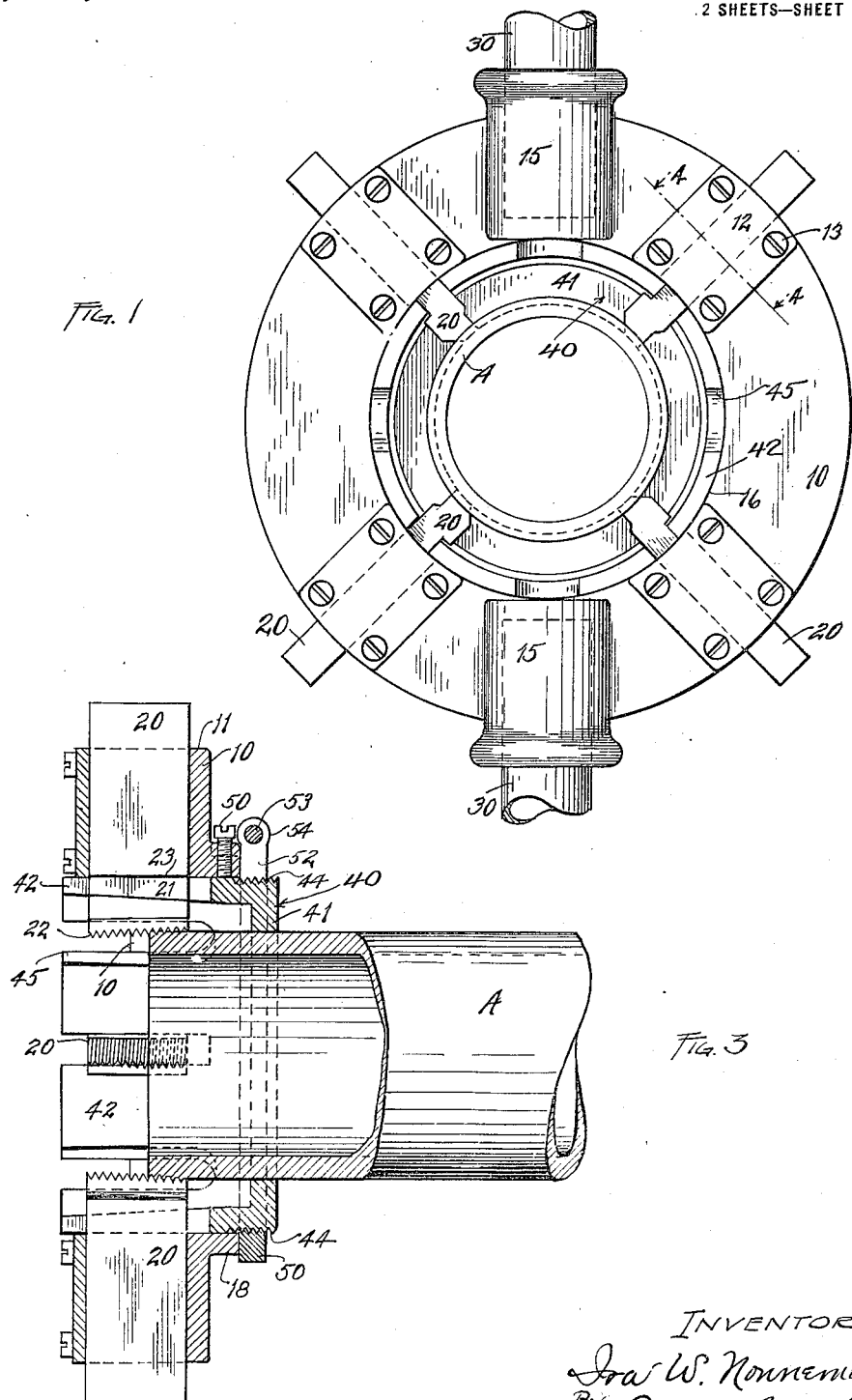

UNITED STATES PATENT OFFICE.

IRA W. NONNEMAN, OF WARREN, OHIO, ASSIGNOR TO THE BORDEN COMPANY, OF WARREN, OHIO, A CORPORATION OF OHIO.

DIESTOCK.

1,320,644.  Specification of Letters Patent.  Patented Nov. 4, 1919.

Application filed September 16, 1918. Serial No. 254,231.

*To all whom it may concern:*

Be it known that I, IRA W. NONNEMAN, a citizen of the United States, residing at Warren, in the county of Trumbull and State of Ohio, have invented a certain new and Useful Improvement in Diestocks, of which the following is a full, clear, and exact description, reference being had to the accompanying drawings.

In the cutting of male threads on a pipe it is frequently desirable to be able to cut the threads to various depths different from the standard, in order to make an accurate engagement with a previously threaded female fitting. An object of this invention is to provide in a very simple form a die stock adapted to be readily adjusted for this purpose. To this end I have provided a rotary frame, thread cutting chasers carried thereby, and a simple device for simultaneously adjusting all of the chasers to different distances from the axis and locking them in this position. My invention is hereinafter more fully described and its essential characteristics are summarized in the claims.

The drawings illustrate an approved form of my invention. Figure 1 is an end elevation of a die stock embodying the same; Fig. 2 is an elevation of the die stock from the opposite side of Fig. 1, being a section through the pipe being threaded; Fig. 3 is a longitudinal section of the die stock showing a pipe partly broken away; Fig. 4 is a detail, being a cross section on the line 4—4 of Fig. 1; Fig. 5 is a perspective view of one of the chasers employed.

As shown in Figs. 1, 2 and 3, 10 represents a suitable rotary chaser-carrying frame. This frame is in the form of a ring having housings for carrying the chasers and sockets in which the operating handles are fitted. The housings consist of recesses in the frame provided by bosses 11 on the rear side of the frame and plates 12 extending across the recesses and secured to the main plate 10 by screws 13. The chasers designated 20 have angular shanks occupying these recesses. The sockets for the handles are integral tubular bosses 15 formed as a part of the frame 10. Into these sockets screw the end portion of the usual operating handles 30.

Each chaser 20 is formed with a groove 21 in its side face comparatively near the toothed edge 22. This groove has its outer wall 23 at right angles to the length of the chasers, but its inner wall 24 at an acute angle thereto. 40 indicates a cup-like bushing having a flange 41 adapted to embrace the pipe being threaded to form a guide for it and a cylindrical flange 42 snugly occupying the bore 16 of the frame 10. This cylindrical flange 42 is slotted where it extends across the chasers, the edge wall thus provided occupying the notches 21 of the chasers. The inner face of this flange 42 is tapered correspondingly to the taper of the chaser shoulders 24. The wall 42 therefore makes an effective abutment limiting the position of the chasers, while this position may be adjusted by changing the position of the sleeve member 40.

To hold the chasers in adjusted position I have provided a suitable lock for the bushing 40, consisting of a set screw 50 screwing through a boss on the annular flange 18 on the rear face of the chaser frame and abutting against the member 40. To enable the accurate positioning of this member I provide an adjustable shoulder on it, consisting of a split internally threaded ring or nut 52 which engages threads 44 on the member 40 and limits the movement thereof into the chaser frame, by reason of the threaded ring abutting the rear face of the chaser frame. This ring 52 is clamped in position on the member 40 by means of the screw-bolt 53 screwing through one of the ears 54 on the ring 52 and into the other ear 54 on that ring.

By the construction described, the member 40 is normally held in a fixed relation to the chaser-carrying frame 10 and therefore provides a fixed abutment for the chasers 20. When it is desired to vary the position of these chasers toward or from the axis of rotation the screws 50 and 53 are loosened, the nut 52 rotated in one direction or the other and again clamped in position by the screw 53 and then the member 40 with this nut abutting the boss 18 is clamped to the chaser frame by the set screw 50.

In the drawings, A represents a pipe being threaded by the die stock described. It will be seen that the flange portion 41 of the member 40 by engaging the exterior of this pipe forms an effective guide for the die stock, insuring the chasers properly engaging the end portion of the pipe. To provide for the discharge of chips cut by the chasers I prefer to make longitudinal notches 45 in the cylindrical skirt 42 of the clamping member 40.

Having thus described my invention, what I claim is:

1. In a die stock, the combination of a frame having a bore, chasers carried by the frame extending into the bore, a bushing occupying the frame having openings through which the chasers extend, said bushing having a tapered interior, and said chasers having correspondingly tapered shoulders engaged by tapered surface of the bushing.

2. In a die stock, the combination of a rotary frame, chasers carried thereby having shoulders on their sides, a sleeve extending through a bore in the chaser frame having slots, the walls of which straddle the chasers, one of said walls engaging the shoulders of the chasers and being internally tapered.

3. In a die stock, the combination of a chaser frame having an internal bore, radial housings carried by the frame, chasers occupying said housings, a sleeve occupying said bore and having slots embracing the chasers, portions of the sleeve adjacent to the slots engaging the shoulders of the chasers, said sleeve being internally tapered and the shoulders correspondingly tapered.

4. In a die stock, the combination of a frame, chasers carried thereby having shoulders between the ends of the chasers, a sleeve having slots occupied by the chasers, the edge portions of the sleeves adjacent the slots straddling the chasers and being adapted to engage the chaser shoulders, and means for clamping the sleeve to the chaser frame.

5. In a die stock, the combination of a rotary frame, chasers carried thereby having shoulders on their sides, a sleeve extending through a bore in the chaser frame having slots, the walls of which straddle the chasers, one of said walls engaging the shoulders of the chasers and being internally tapered, and means for clamping said sleeve to the chaser frame.

6. In a die stock, the combination of a chaser frame having an internal bore, radial housings carried by the frame, chasers occupying said housings, a sleeve occupying said bore and having slots embracing the chasers, portions of the sleeve adjacent to the slots engaging the shoulders of the chasers, said sleeve being internally tapered and the shoulders correspondingly tapered, and a set screw screwing through a boss on the chaser frame and abutting against said sleeve.

7. In a die stock, the combination of a frame having a bore, chasers carried by the frame extending into the bore, a bushing occupying the frame having openings through which the chasers extend, said bushing having a tapered interior, said chasers having shoulders engaged by tapered face of the bushing, and means for positioning the bushing in the frame and rigidly clamping it thereto.

8. In a die stock, the combination of a rotary frame, chasers carried thereby having shoulders on their sides, a sleeve extending through a bore in the chaser frame having slots, the walls of which straddle the chasers, one of said walls engaging the shoulders of the chasers, and a split internally threaded ring surrounding the sleeve and having a threaded engagement with it and adapted to form an adjustable abutment against the chaser frame.

9. In a die stock, the combination of a chaser frame having an internal bore, radial housings carried by the frame, chasers occupying said housings, a sleeve occupying said bore and having slots embracing the chasers, portions of the sleeve adjacent to the slots engaging the shoulders of the chasers, said sleeve being internally tapered and the shoulders correspondingly tapered, said sleeve extending beyond the chaser frame and carrying an external thread at such point, an abutment nut surrounding the sleeve on said thread, and means for clamping the abutment nut to the sleeve.

10. In a die stock, the combination of a rotary frame, a plurality of chasers carried thereby, and means adjustable as a unit and adapted to be clamped to a chaser-carrying frame for defining the effective position of the chasers, and a pipe guide carried by said means.

11. In a die stock, the combination of a rotary frame, a bushing having its wall occupying the interior of the frame, said wall being internally tapered, chasers carried by the frame extending through the bushing and having shoulders engaged by said tapered portion, and a pipe guide carried by the bushing.

12. In a die stock, the combination of a rotary frame, chasers carried thereby, and a sleeve adjustably secured to the frame and providing an adjustable limit for the chasers and adapted to engage the exterior of a pipe being threaded and thus provide a guide for the die stock.

13. In a die stock, the combination of a frame, chasers carried thereby having shoulders, a sleeve having slots occupied by the chasers, the edge portions of the sleeve adjacent the slots being adapted to engage the chaser shoulders, said sleeve having an inwardly directed flange having a bore adapted to embrace the pipe being threaded and guide the die stock.

14. In a die stock, the combination of a rotary frame, a cup-shaped bushing having its wall occupying the interior of the frame, said wall being internally tapered, chasers carried by the frame extending through the bushing and having shoulders engaged by said tapered portion, the head of the cup-shaped portion carrying a pipe guide, and means for positioning the bushing in the frame and rigidly clamping it thereto.

15. In a die stock, the combination of a frame having housings, chasers carried therein and having shoulders, a sleeve extending into a central bore in the frame and internally tapered and having slots occupied by the chasers, the edge portions of the sleeve adjacent the slots being adapted to engage the chaser shoulders, means on the sleeve for positioning it, and means for clamping the sleeve to the chaser frame, said sleeve having an inwardly directed flange having a bore adapted to embrace the exterior of a pipe being threaded and guide the die stock.

In testimony whereof, I hereunto affix my signature.

IRA W. NONNEMAN.

Copies of this patent may be obtained for five cents each, by addressing the "Commissioner of Patents, Washington, D. C."